(No Model.)
S. STEVENS.
NUT LOCK.
No. 529,633. Patented Nov. 20, 1894.
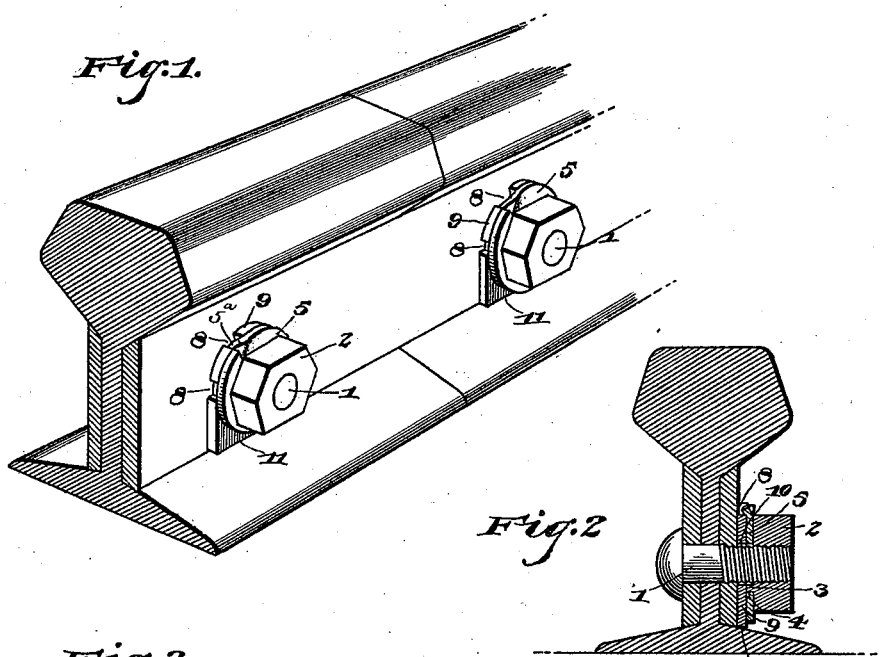
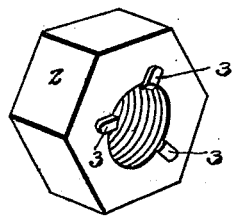
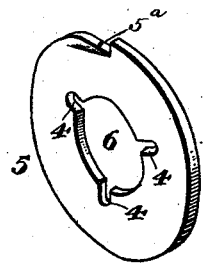
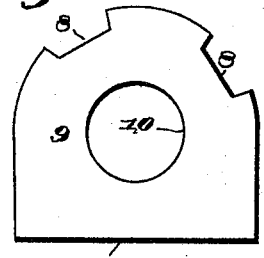
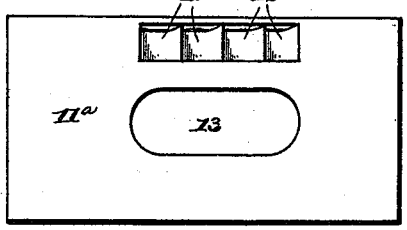
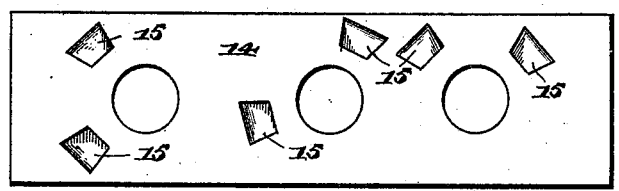
Witnesses
B. S. Ober
H. F. Riley
Inventor
Sylvanus Stevens,
By his Attorneys.
C. A. Snow & Co.

UNITED STATES PATENT OFFICE.

SYLVANUS STEVENS, OF HOLGATE, OHIO.

NUT-LOCK.

SPECIFICATION forming part of Letters Patent No. 529,633, dated November 20, 1894.

Application filed July 14, 1894. Serial No. 517,550. (No model.)

*To all whom it may concern:*

Be it known that I, SYLVANUS STEVENS, a citizen of the United States, residing at Holgate, in the county of Henry and State of Ohio, have invented a new and useful Nut-Lock, of which the following is a specification.

This invention relates to improvements in nut locks.

The object of the present invention is to improve the construction of nut locks and to provide a simple, inexpensive and efficient one which will be adapted for rail joints and the like, and which will be capable of securely locking a nut against accidental unscrewing, and at the same time permit the nut to be readily removed when desired.

The invention consists in the construction and novel combination and arrangement of parts hereinafter fully described, illustrated in the accompanying drawings, and pointed out in the claim hereto appended.

In the drawings:—Figure 1 is a perspective view of a nut lock constructed in accordance with this invention and shown applied to a rail joint. Fig. 2 is a vertical sectional view of the same taken transversely through the rail joint. Fig. 3, is a detail perspective view of the nut showing the inner end or face of the same. Fig. 4, is a detail perspective view of the washer. Fig. 5 is a plan view of the ratchet piece. Figs. 6 and 7 are similar views showing modifications of the ratchet piece.

Similar numerals of reference designate corresponding parts in all the figures of the drawings.

1 designates a bolt, having arranged on its threaded end a nut 2, which is provided on its inner face with lugs 3, located adjacent to the threaded openings of the nut and arranged equal distances apart and engaging sockets 4, of a locking washer 5. The locking washer 5, is rigidly and detachably secured to the inner face of the nut by having its sockets 4, engaged by the lugs, and these sockets are preferably formed by openings or slots cut into the washer adjacent to its central opening 6. At its periphery the locking washer is provided with an integral angularly disposed tooth $5^a$ shouldered at one end and formed by punching or off-setting a portion of the periphery of the washer as shown after the nut has been screwed on the bolt.

The tooth of the locking washer is provided with a square shoulder for engaging recesses 8, of a ratchet piece 9, which is provided with a central bolt opening 10, and which has its lower edge 11 straight and adapted to rest upon the lower portion of an angular fish-plate or upon the bottom flange of a rail to prevent the ratchet piece from turning with the nut. The recesses 8, which are adapted to be engaged by the tooth of the locking washer are arranged concentric with the bolt-opening, but as illustrated in Figs. 6 and 7 of the accompanying drawings, they may be formed by depressions in the face of the ratchet piece.

The tooth $5^a$, which is formed by the radial cut, is resilient; and the nut is adapted to be located forward to carry the tooth from one recess to another to tighten the parts.

The ratchet piece $11^a$, illustrated in Fig. 6, is provided with a straight series of horizontally disposed shouldered depressions 12, arranged above an elongated opening 13, which permit an adjustment of the ratchet piece; and the ratchet piece 14, is provided with concentric depressions 15.

The nut may be readily screwed on the bolt with the washer and the tooth of the latter will engage one of the ratchet recesses; and by forcing the ratchet piece inward or the locking washer outward the tooth may be disengaged to permit the nut to be unscrewed without impairing in any manner the usefulness of the nut lock. It will be apparent that the nut lock is simple and comparatively inexpensive in construction, and that it is positive and reliable in operation, and that it is capable of effectually preventing a nut from accidentally unscrewing.

Changes in the form, proportion and the minor details of construction may be resorted to without departing from the principle or sacrificing any of the advantages of this invention.

What I claim is—

In a nut lock, the combination of a ratchet piece having a lower straight edge and provided at its upper edge with a series of recesses, a nut provided on its inner face with a series of integral radial lugs extending outward from the bolt openings, and a locking washer having a bolt opening and provided with a series of slots disposed radially and agreeing in number with the lugs and extending outward from the bolt openings and receiving the lugs, said locking washer being provided at its periphery with a resilient tooth formed by a radial cut and set at an angle and providing a square shoulder for engaging the recesses, whereby the nut is adapted to be rotated forward to carry the tooth from one recess to another to tighten the parts, substantially as described.

In testimony that I claim the foregoing as my own I have hereto affixed my signature in the presence of two witnesses.

SYLVANUS STEVENS.

Witnesses:
L. STEVENS,
LAURA FISHER.